US012633201B2

(12) United States Patent
Huang et al.

(10) Patent No.: US 12,633,201 B2
(45) Date of Patent: May 19, 2026

(54) WEARABLE DEVICE

(71) Applicant: AAC Technologies (Nanjing) Co., Ltd., Nanjing (CN)

(72) Inventors: Xingzhi Huang, Nanjing (CN); Wei Song, Nanjing (CN); Lubin Mao, Nanjing (CN); Jie Ma, Nanjing (CN); Yun Tang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 195 days.

(21) Appl. No.: 18/536,190

(22) Filed: Dec. 11, 2023

(65) Prior Publication Data

US 2024/0339018 A1 Oct. 10, 2024

Related U.S. Application Data

(63) Continuation of application No. PCT/CN2023/086172, filed on Apr. 4, 2023.

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC ................................ G08B 6/00; G06F 3/016
See application file for complete search history.

(56) References Cited

U.S. PATENT DOCUMENTS 7,604,348 B2 * 10/2009 Jacobs ................ H04N 13/337 359/464
10,571,715 B2 * 2/2020 Rizzo, III .............. G02C 5/001
10,699,691 B1 * 6/2020 Ye .................... G10K 11/17881
2012/0176580 A1 * 7/2012 Sonsino .................. G02C 7/14 351/158
2022/0054092 A1 * 2/2022 Howell .................. H04L 67/30
2025/0070220 A1 * 2/2025 Xu ...................... G02B 27/017

* cited by examiner

*Primary Examiner* — Toan N Pham
(74) *Attorney, Agent, or Firm* — Wiersch Law Group

(57) ABSTRACT

The present disclosure provides a wearable device, including: a casing having an accommodating cavity and an opening communicating with the accommodating cavity, a feedback module arranged in the accommodating cavity, and a moveable part. One end of the moveable part is connected to the feedback module, and an other end protrudes from a surface of the casing via the opening. The feedback module includes a speaker and a vibration component, the moveable part is connected to the vibration component and vibrates with the vibration component. When a wearer wears the wearable device, the end of the moveable part protruding from the casing contacts with the wearer's skin. When the moveable part vibrates, the wearer can be warned. The feedback module provided by the present disclosure includes a speaker and a vibration component, which can warn the wearer by auditory and tactile senses, thereby improving user experience of the wearer.

9 Claims, 15 Drawing Sheets

B-B

WEARABLE DEVICE

CROSS REFERENCE TO RELATED APPLICATIONS

The present application is a continuation of PCT Patent Application No. PCT/CN2023/086172, filed Apr. 4, 2023, which claims priority to Chinese patent application No. 202320730490.5, filed Apr. 4, 2023, each of which is incorporated by reference herein in its entirety.

TECHNICAL FIELD

The present disclosure relates to the field of electronic devices, and in particular to a wearable device.

BACKGROUND

Augmented Reality (AR) or Virtual Reality (VR) products enable users to interact with a virtual world. A device which is worn on the user's head of an AR/VR product in the related technologies has speakers configured to emit sound to warn the user. However, the existing AR/VR products have few ways to warn the user, resulting in a poor user experience.

Therefore, it is necessary to provide a wearable device capable of warning the user through tactile sense, in order to improve user experience.

SUMMARY

The present disclosure aims to provide a wearable device for addressing the problem that the existing AR/VR products have few ways to warn the user.

The technical solutions of the present disclosure include: a wearable device, including:

- a casing having an accommodating cavity;
- a feedback module arranged in the accommodating cavity; and
- a moveable part, one end of the moveable part is connected to the feedback module, and an other end of the moveable part is in contact with a wearer.

The feedback module includes a speaker and a vibration component, the casing includes an opening, the moveable part is connected to the vibration component through the opening, and the vibration component is able to vibrate along a height direction of the feedback module.

As an improvement, the casing includes at least one guide groove, and the at least one guide groove and the opening are defined on a same side of the casing. The moveable part includes at least one protrusion, and each protrusion of the at least one protrusion is able to move into and move along a respective guide groove of the at least one guide groove.

As an improvement, the casing includes at least two guide grooves defined at intervals and surrounding the opening. The moveable part includes at least two protrusions, and each protrusion of the at least two protrusions is arranged to correspond to a respective guide groove of the at least two guide grooves.

As an improvement, a contact part configured to contact with the wearer is arranged on an end of the moveable part away from the vibration component, and the contact part is of a skin friendly material.

As an improvement, the feedback module includes a mounting bracket connected to the casing and a magnetic circuit system arranged in the mounting bracket. The vibration component includes a vibration coil, the speaker includes a voice coil, and the vibration coil and the voice coil extend, along the height direction of the feedback module, into the magnetic circuit system from either sides of the magnetic circuit system.

As an improvement, the vibration component includes a first elastic member, one end of the first elastic member is connected to the mounting bracket, and an other end of the first elastic member is connected to the vibration coil. The first elastic member deforms in response to movement of the vibration coil.

As an improvement, the vibration component includes a support member having a main body and fixing parts. The main body is configured as an annulus, one respective fixing part of the fixing parts arranged on an inner side of the main body is connected to the magnetic circuit system, and one respective fixing part of the fixing parts arranged on an outer side of the main body is connected to the mounting bracket; and in the height direction of the feedback module, the main body is arranged between the moveable part and the vibration coil.

As an improvement, in a length direction of the feedback module, the vibration component is arranged on a side of the speaker. The vibration component includes an iron core, a drive coil, and a magnetic part, the drive coil is sleeved on the iron core, the magnetic part is sleeved on the drive coil, and there is a gap between the magnetic part and the drive coil. The iron core and the drive coil are moveable along the height direction of the feedback module.

As an improvement, the vibration component further includes a connecting part, one end of the connecting part is connected to the moveable part, and an other end of the connecting part is connected to the vibration component.

As an improvement, the vibration component further includes a second elastic member, one end of the second elastic member is connected to the iron core, and an other end of the second elastic member is connected to the magnetic part. The second elastic member deforms in response to movement of the iron core.

The present disclosure has the following beneficial effects: the feedback module inside the wearable device includes a speaker and a vibration component, which can warn the wearer by auditory and tactile senses, thereby increasing the ways in which the wearable device warns the wearer and improving user experience of the wearer.

DETAILED DESCRIPTION OF EMBODIMENTS

Figure 1:
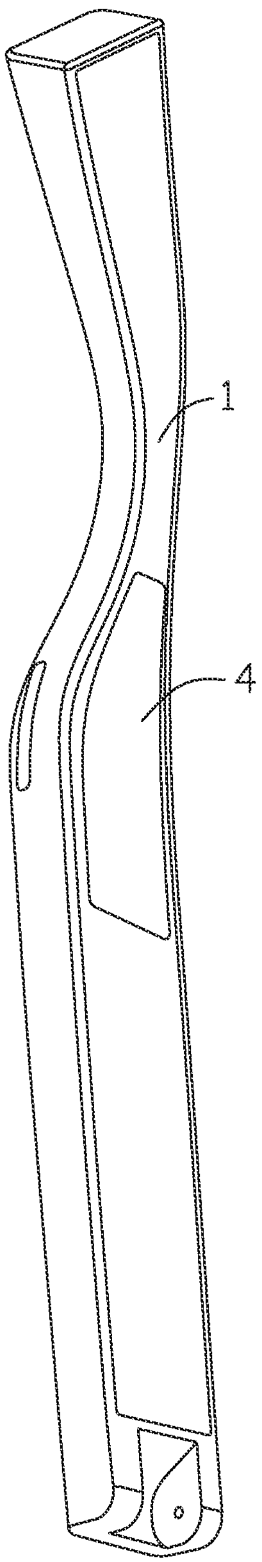
FIG. 1 is a structural schematic diagram of the portion configured to contact with the wearer of the wearable device according to some embodiments of the present disclosure.

The following will provide, in conjunction with the accompanying drawings and the embodiments of the present disclosure, detailed description of the present disclosure.

As shown in FIGS. 1 to 4, the present disclosure provides a wearable device, including: a casing 1 having an accommodating cavity 11, a feedback module 2 and a moveable part 3 both arranged in the accommodating cavity 11. The casing 1 includes an opening 12, one end of the moveable part 3 is connected to the feedback module 2 through the opening 12, and an other end of the moveable part contacts with a wearer. The feedback module 2 includes a speaker 21 and a vibration component 22. The vibration component 22 vibrates in a direction directing from the accommodating cavity 11 towards the opening 12, and the moveable part 3 is fixedly connected to the vibration component 22, such that the moveable part 3 is also able to vibrate along a height direction of the feedback module 2.

The wearable device may be electronic devices such as AR devices or VR devices. Taking AR glasses as an example, feedback module 2 may be arranged in the legs of AR glasses and arranged to contact with the wearer's skin, to allow the wearer to feel the vibration of the moveable part 3. The feedback module 2 includes a speaker 21, and the wearable device may warn the wearer using the sound emitted by the speaker 21. The feedback module 2 further includes a vibration component 22 configured to drive the moveable part 3 to vibrate, thereby warning the wearer through tactile sense. In this way, the user experience of the wearer can be improved.

Figure 2:
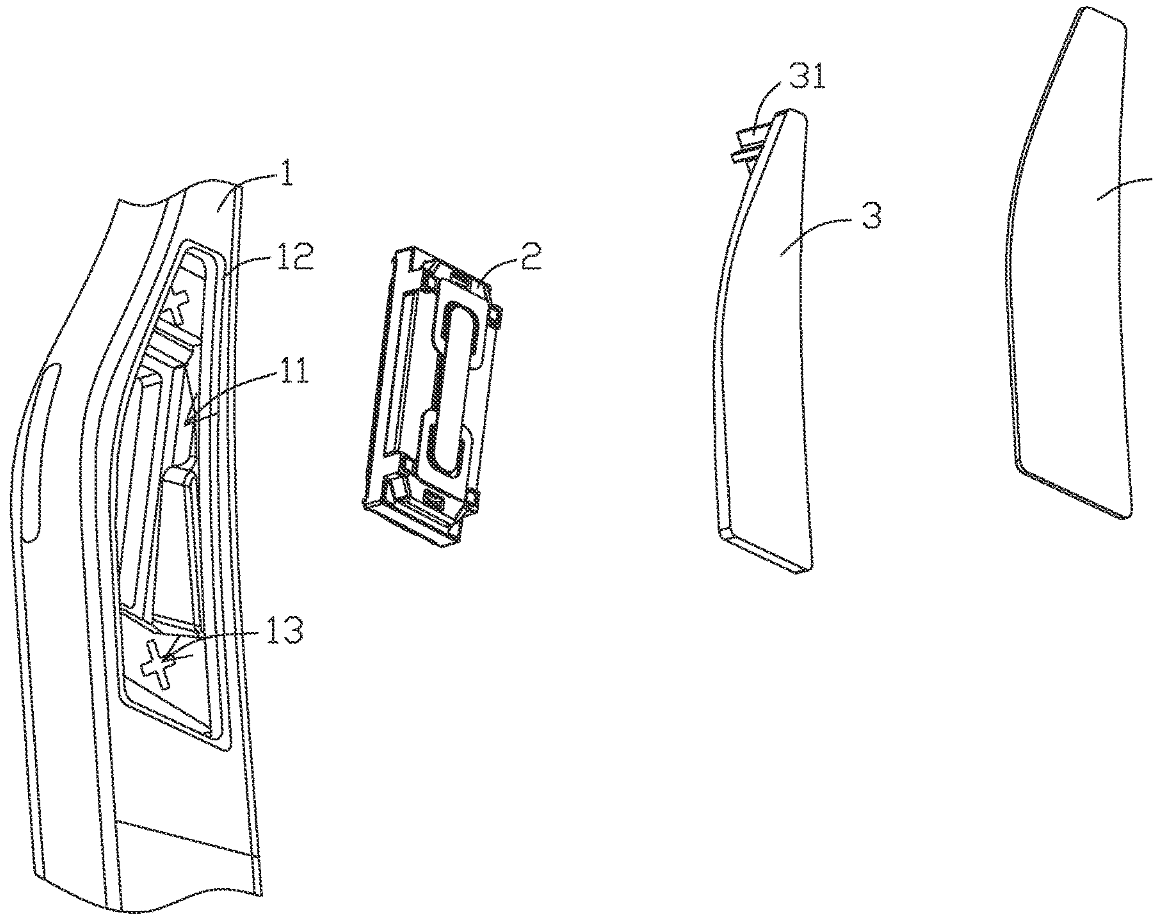
FIG. 2 is an exploded view of the portion configured to contact with the wearer of the wearable device according to some embodiments of the present disclosure.
Figure 3:
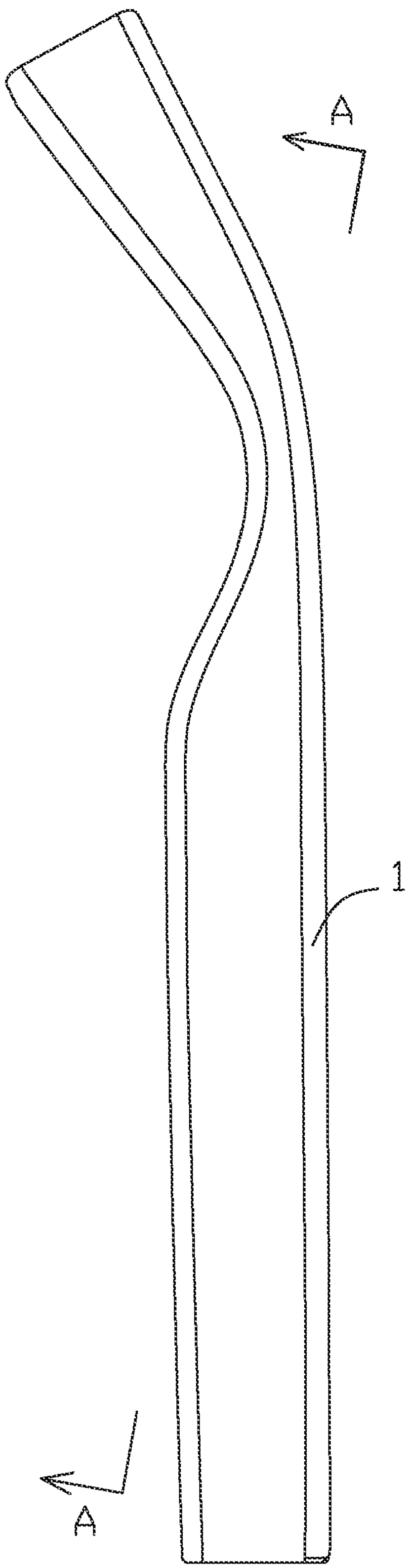
FIG. 3 is a side view of the portion configured to contact with the wearer of the wearable device according to some embodiments of the present disclosure.
Figure 4:
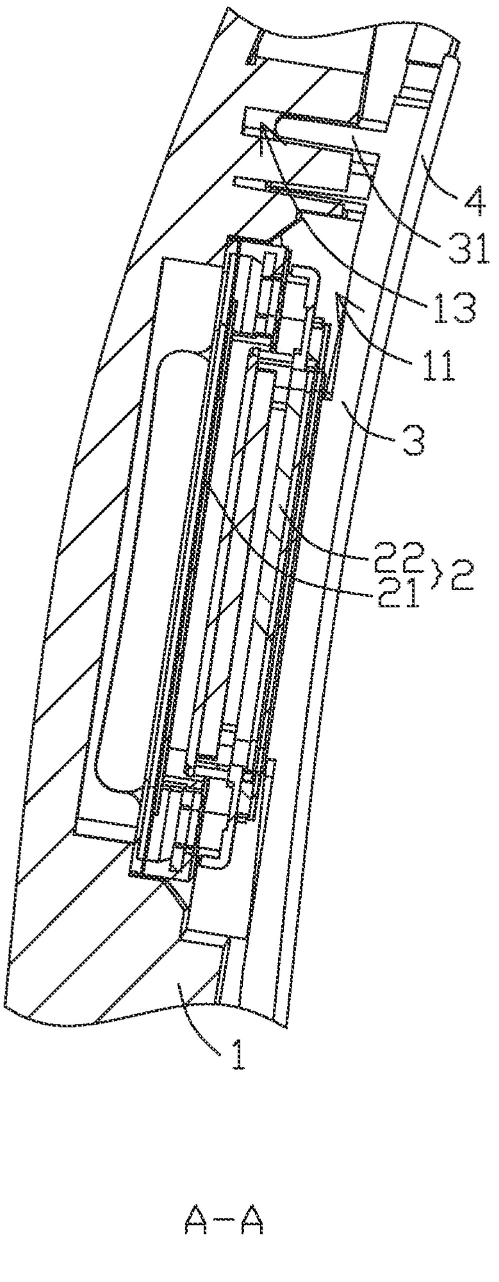
FIG. 4 is a section view along the A-A direction in FIG. 3.
Figure 5:
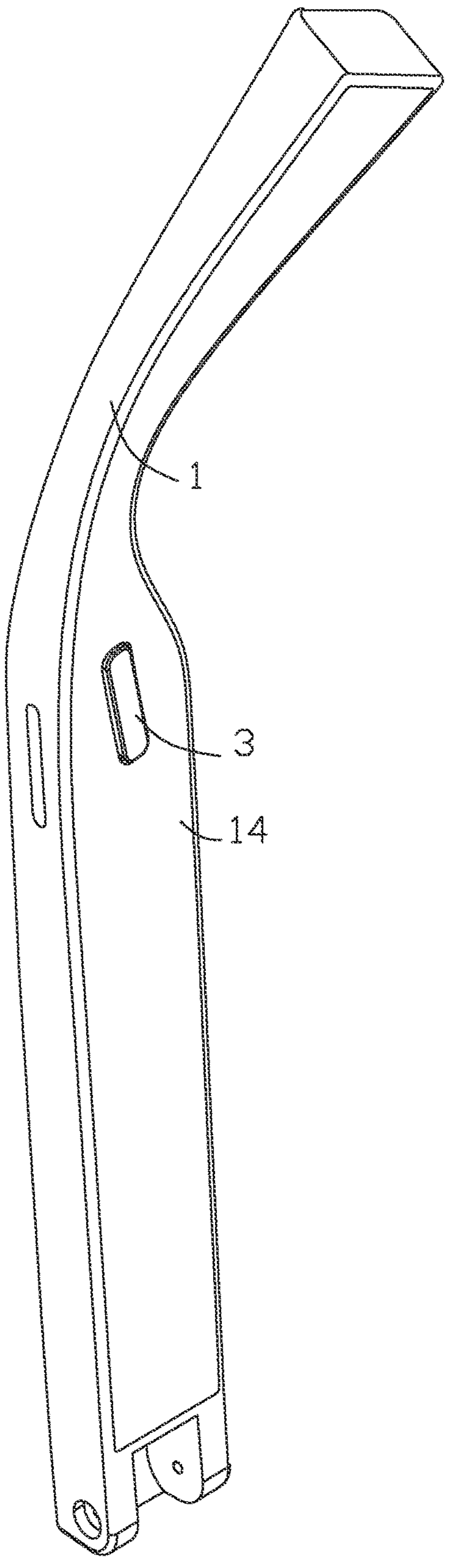
FIG. 5 is a structural schematic diagram of the portion configured to contact with the wearer of the wearable device according to some other embodiments of the present disclosure.
Figure 6:
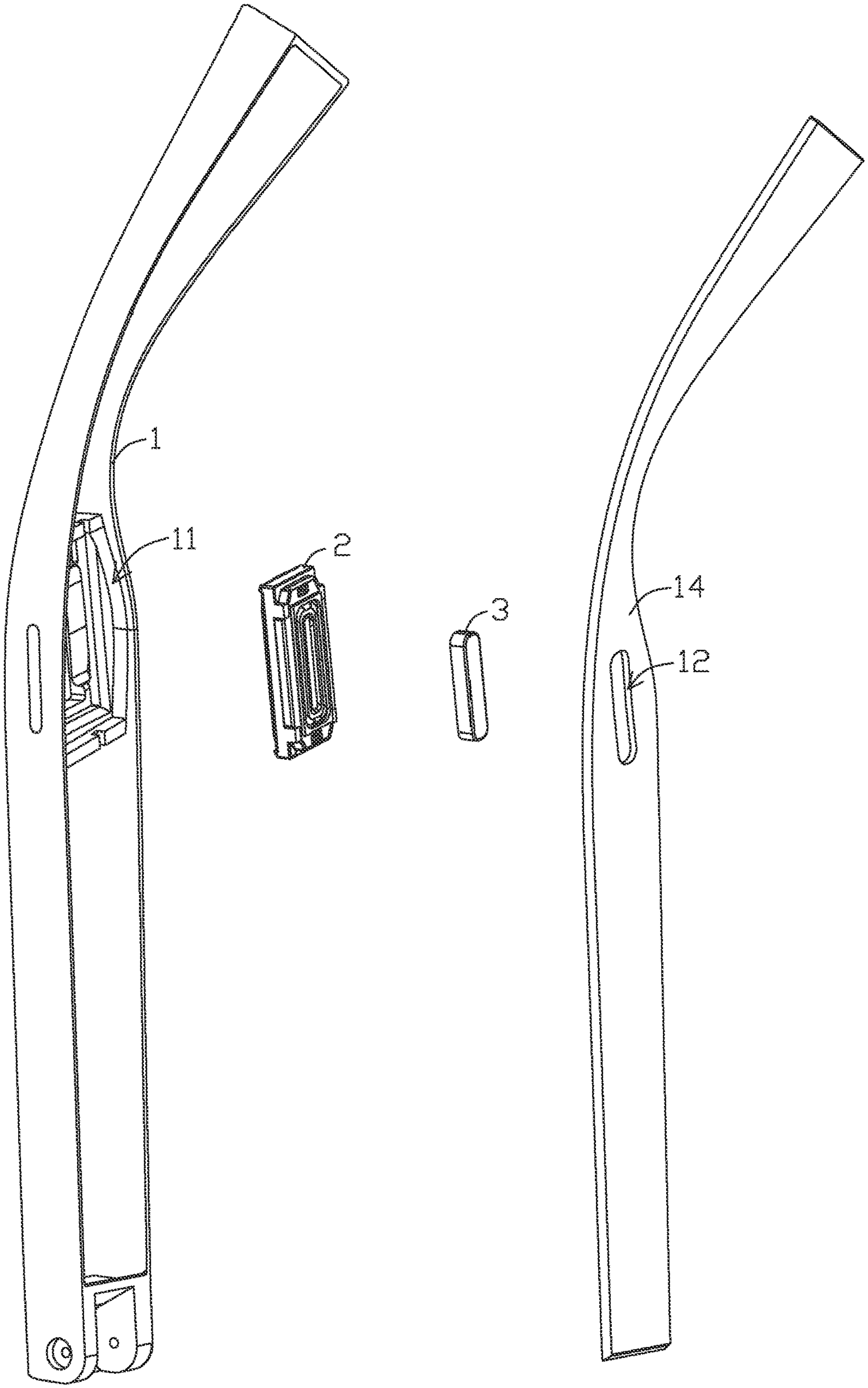
FIG. 6 is an exploded view of the portion configured to contact with the wearer of the wearable device according to some other embodiments of the present disclosure.
Figure 7:
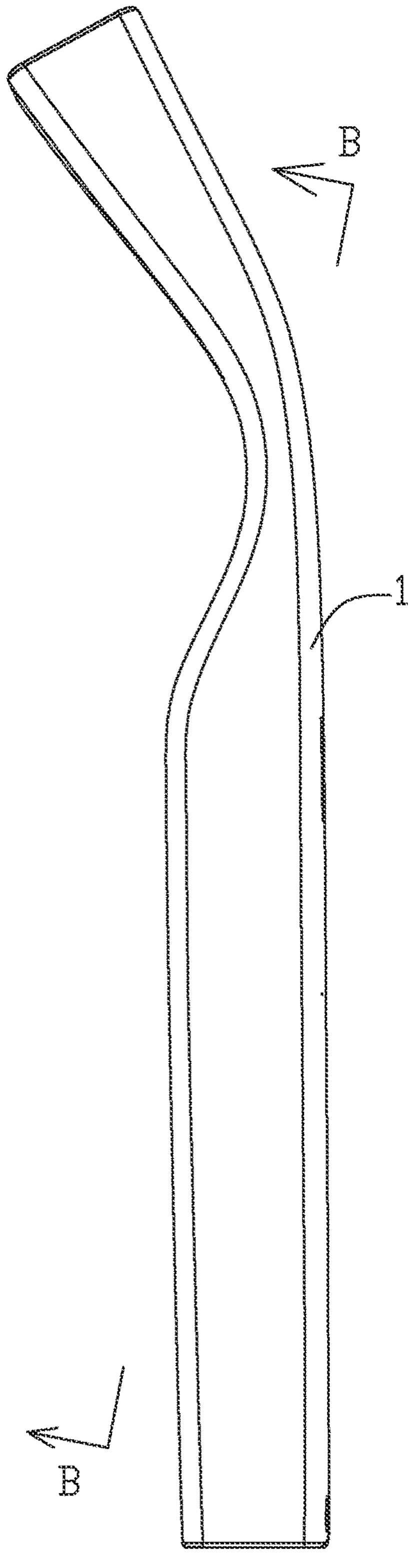
FIG. 7 is a side view of the portion configured to contact with the wearer of the wearable device according to some other embodiments of the present disclosure.
Figure 8:
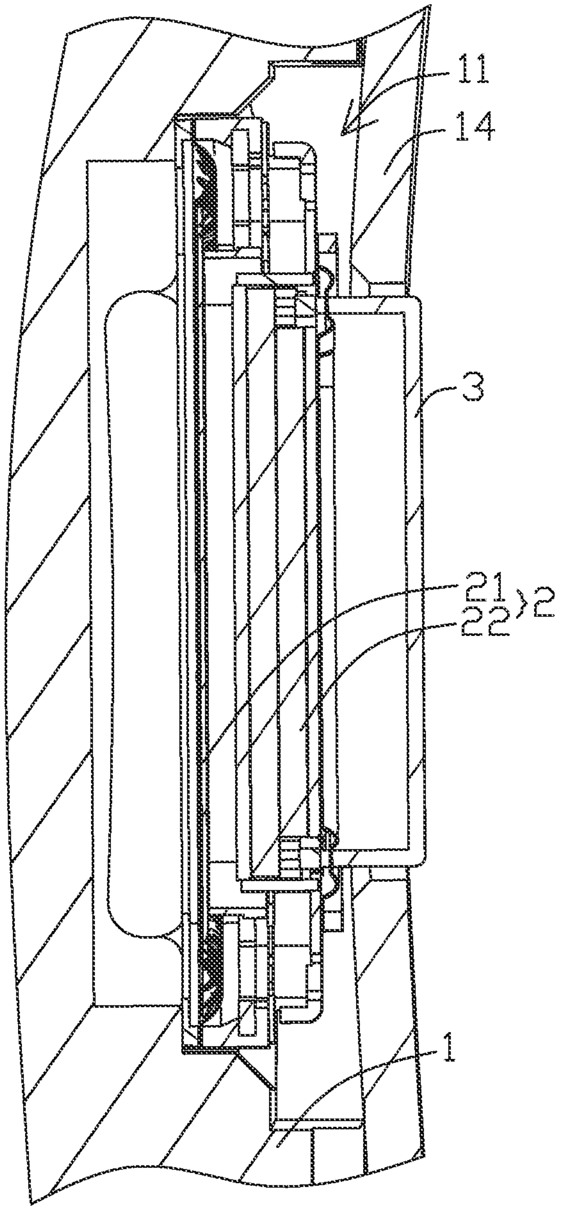
FIG. 8 is a section view along the B-B direction in FIG. 7.

As shown in FIGS. 2 and 4, in some embodiments, the casing 1 includes at least one guide groove 13, the at least one guide groove 13 and the opening 12 are defined on a same side of the casing 1, and the at least one guide groove 13 extends along the direction directing from the opening 12 towards the accommodating cavity 11. The moveable part 3 includes at least one protrusion 31 formed on a side of the moveable part facing towards the feedback module, and each protrusion of the at least one protrusion 31 is able to move into and move along a respective guide groove of the at least one guide groove 13.

With the cooperation of the at least one guide groove 13 and the at least one protrusion 31, the movement directions of the moveable part 3 during vibration of the moveable part relative to the casing 1 can be limited. In this way, the possibility that the moveable part 3 moves relative to the casing 1 along other directions can be reduced, and the stability of the wearable device can be improved.

As shown in FIG. 2, in some embodiments, the cross-section of each guide groove 13 may be X-shaped, rectangular, or other shapes except for a circular shape. The cross-section of each protrusion 31 corresponds to the cross-section of a respective guide groove 13. When a protrusion 31 moves into a respective guide groove 13, the relative position of the casing 1 to the moveable part 3 can be limited, thereby reducing the possibility that the moveable part 3 rotates relative to the casing 1.

As shown in FIGS. 2 and 4, in some embodiments, the casing 1 includes, on a side of the casing, at least two guide grooves 13 defined at intervals and surrounding the opening 12. The moveable part 3 includes at least two protrusions 31, and each protrusion of the at least two protrusions 31 is arranged to correspond to a respective guide groove of the at least two guide grooves 13.

By providing a plurality of guide grooves 13 and a plurality of protrusions 31, the relative position of the moveable part 3 to the casing 1 can be limited, and the possibility that the moveable part 3 rotates relative to the casing 1 can be reduced, thereby limiting the relative position of the moveable part 3 to the vibration component 22, and reducing the possibility that the moveable part 3 detaches from the vibration component 22 due to shaking. In this way, the reliability of the wearable device can be improved.

As shown in FIGS. 2 and 4, in some embodiments, a contact part 4 is arranged on a surface of the moveable part 3 away from the vibration component 22, and the contact part 4 is made of a skin friendly material. The moveable part 3 contacts with the wearer through the contact part 4.

In order to warn the wearer when the moveable part 3 vibrates, it is necessary for the moveable part 3 to come into contact with the wearer's skin. By arranging the contact part 4 made of a skin friendly material on the outer surface of the moveable part 3, the wearer's comfort when wearing the wearable device can be improved.

As shown in FIGS. 5 to 8, in some embodiments, the casing includes a cover plate 14 arranged on a side of the casing contacting with the wearer. The opening 12 is defined on the cover plate 14. The moveable part 3 is made of a skin friendly material. One end of the moveable part 3 is connected to the vibration component 22, and the other end of the moveable part passes through the opening 12 and comes into contact with the wearer's skin. The side wall of the opening 12 can limit the vibration directions of the moveable part 3, thereby improving the stability of the moveable part 3 during vibration.

Figure 9:
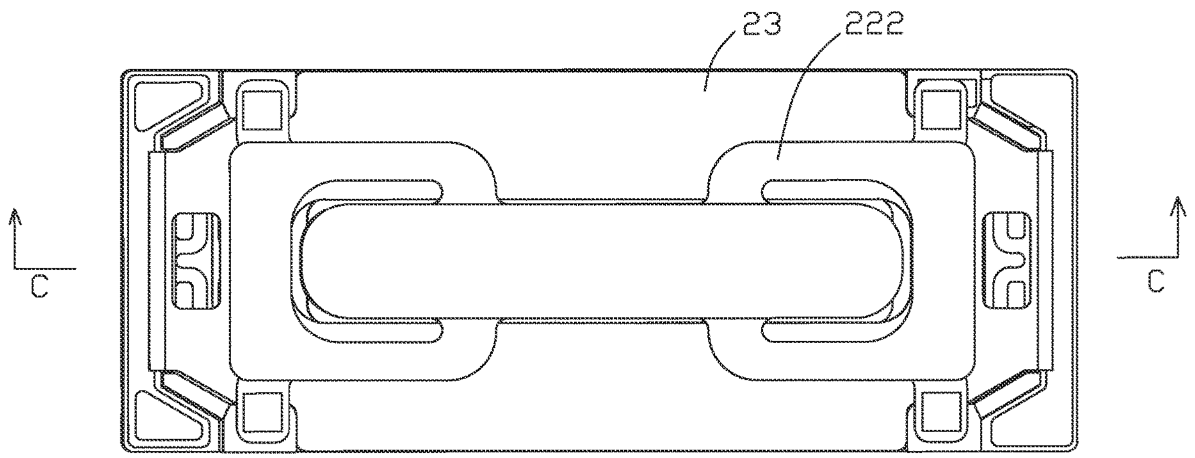
FIG. 9 is a structural schematic diagram of the feedback module according to some embodiments of the present disclosure.
Figure 10:
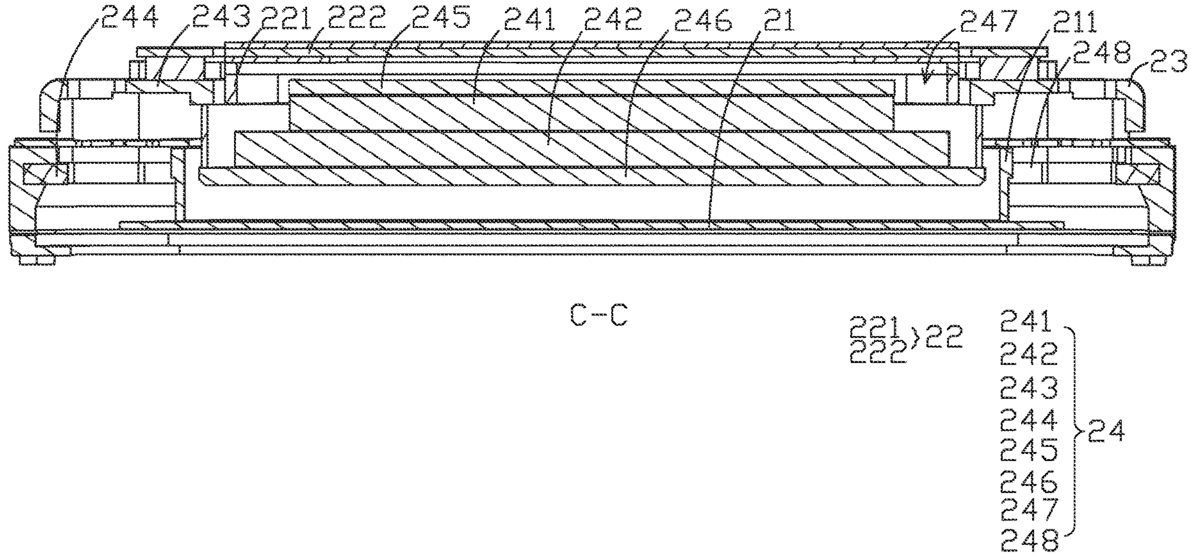
FIG. 10 is a section view along the C-C direction in FIG. 9.

As shown in FIGS. 9 and 10, in some embodiments, the feedback module 2 includes a mounting bracket 23 and a magnetic circuit system 24. The speaker 21, the vibration component 22 and the magnetic circuit system 24 all are connected with the casing 1 through the mounting bracket. In a thickness direction of the feedback module 2, the speaker 21 and the vibration component 22 are arranged on either sides of the magnetic circuit system 24, respectively. The magnetic circuit system 24 includes a first magnet 241, a second magnet 242, a third magnet 243, a fourth magnet 244, a first pole shank 245, and a second pole shank 246. The first pole shank 245, the first magnet 241, the second magnet

242, and the second pole shank 246 are sequentially arranged along the thickness direction of the feedback module 2. The third magnet 243 is arranged to surround the first pole shank 245 and the first magnet 241, and there is a first magnetic gap 247 between the third magnet and the first magnet 241. The vibration component 22 includes a vibration coil 221 arranged in the first magnetic gap 247 and able to move in the first magnetic gap 247. In this way, the vibration coil 221, as a vibrator of the vibration component 22, drives the moveable part 3 to vibrate along the height direction of the feedback module 2. The fourth magnet 244 is arranged to surround the second magnet 242 and the second pole shank 246, and there is a second magnetic gap 248 between the fourth magnet and the second magnet 242. The speaker 21 includes a voice coil 211 arranged in the second magnetic gap 248 and able to move in the second gap to cause the speaker 21 to sound.

The speaker 21 and the vibration component 22 are arranged on either sides of the magnetic circuit system 24 and share a same magnetic circuit system 24. In this way, space utilization can be improved, and the space occupied by the feedback module 2 can be reduced, which is conducive to the miniaturization of the wearable device.

As shown in FIGS. 9 and 10, in some embodiments, the vibration component 22 includes a first elastic member 222 which may be a spring plate. An outer end of the first elastic member 222 is connected to the mounting bracket 23, and an inner end of the first elastic member is connected to the vibration coil 221. The first elastic member 222 can deform in response to the movement of the vibration coil 221. The moveable part 3 is connected to the end of the first elastic member 222 away from the vibration coil 221 and vibrates in response to the deformation of the first elastic member 222.

By connecting the first elastic member 222 with the vibration coil 221, the possibility of shaking of the vibration coil relative to the mounting bracket 23 during movement of the vibration coil 221 can be reduced, the stability of the vibration coil 221 during movement can be improved, and thereby improving the stability of the moveable part 3 during vibration, which is conducive to improvement of the comfort of the wearer.

Figure 11:
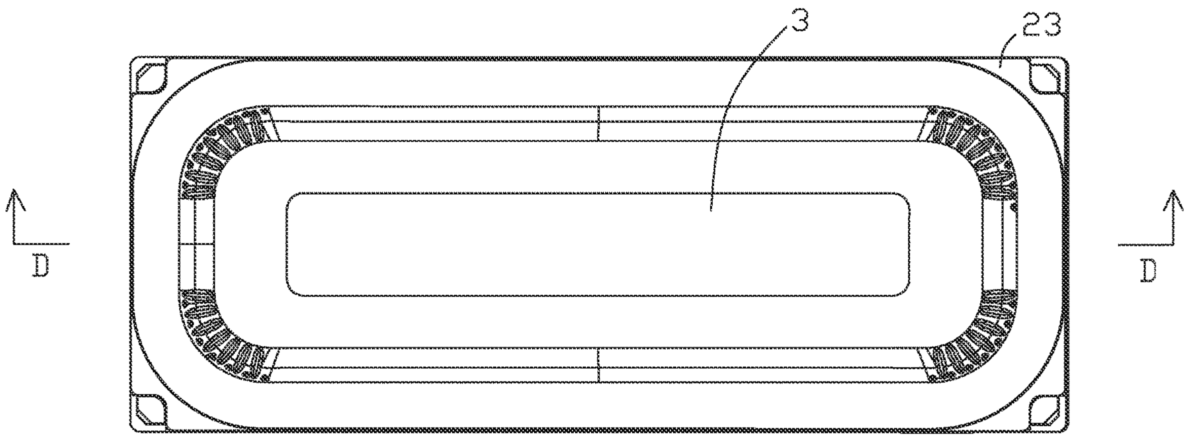
FIG. 11 is a structural schematic diagram of the feedback module according to some other embodiments of the present disclosure.
Figure 12:
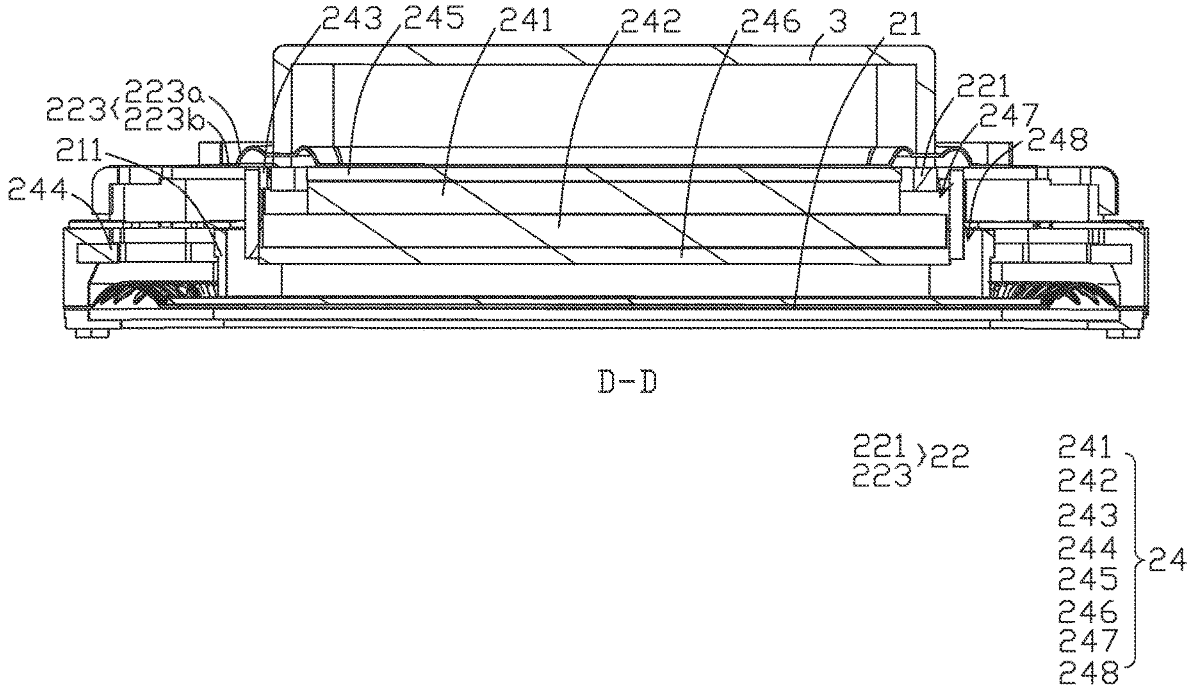
FIG. 12 is a section view along the D-D direction in FIG. 11.

As shown in FIGS. 11 and 12, in some embodiments, the vibration component 22 includes a support member 223, a main body 223*a* of the support member 223 is configured as an annulus and is connected to the vibration coil 221. The moveable part 3 is connected to the end of the main body 223*a* away from the vibration coil 221. Fixing parts 223*b* are arranged on inner side and outer side of the main body 223*a*. One respective fixing part of the fixing parts 223*b* arranged on the inner side of the main body 223*a* is connected to the first pole shank 245, and one respective fixing part of the fixing parts 223*b* arranged on the outer side of the main body 223*a* is connected to the mounting bracket 23. The main body 223*a* can deform in response to movement of the vibration coil 221, and therefore can actuate the moveable part 3 to move.

The main body 223*a* can deform in response to movement of the vibration coil 221, thereby limiting moving directions of the vibration coil 221 in the first magnetic gap 247, and reducing the possibility of shaking of the vibration coil 221 in other directions during movement of the vibration coil. In this way, the stability of the vibration coil 221 and the moveable part 3 during vibration can be improved, which is conducive to improvement of comfort of the wearer.

Figure 13:
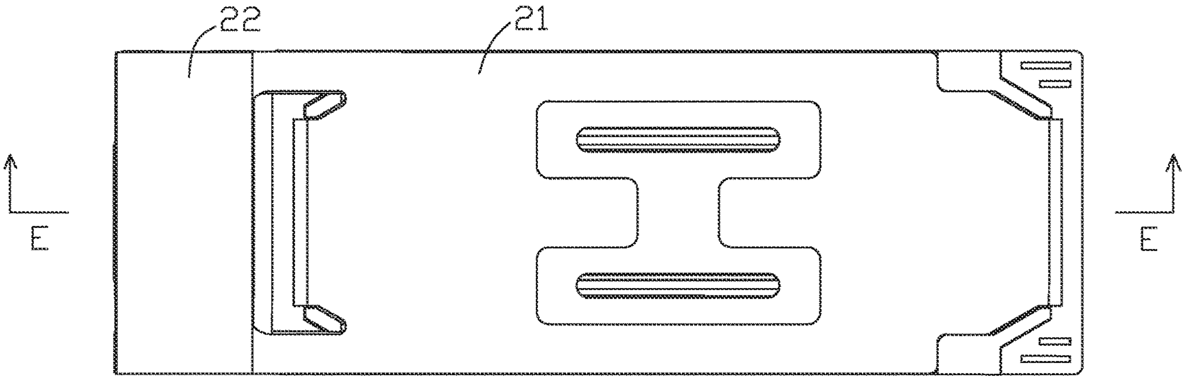
FIG. 13 is a structural schematic diagram of the feedback module according to still some other embodiments of the present disclosure.
Figure 14:
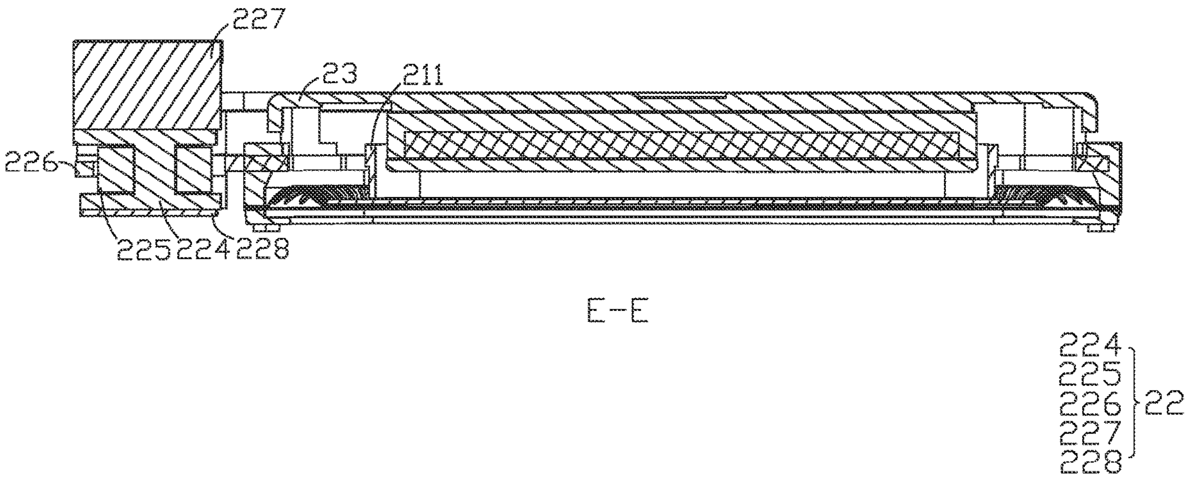
FIG. 14 is a section view along the E-E direction in FIG. 13.
Figure 15:
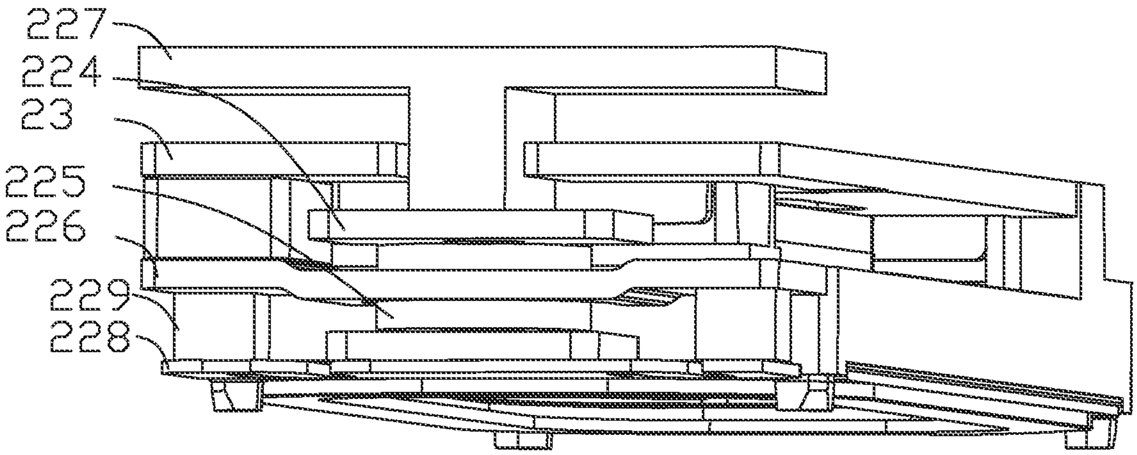
FIG. 15 is a structural schematic diagram of the feedback module from another perspective according to still some other embodiments of the present disclosure.

As shown in FIGS. 13 to 15, in some embodiments, in the length direction of the feedback module 2, the speaker 21 and the vibration component 22 are juxtaposed. The vibration component 22 includes a mass block 224 and a drive coil 225 sleeved on the mass block 224. A magnetic part 226 is arranged along a circumference of the drive coil 225, and there is a gap between the magnetic part 226 and the drive coil 225, to enable the drive coil 225 to move relative to the magnetic part 226.

The mass block 224 is a H-shaped structural member, and the drive coil 225 is arranged in the middle of the mass block 224, enabling the drive coil 225 to move the mass block 224 along the height direction of the feedback module 2. By juxtaposing the speaker 21 and the vibration component 22, the speaker 21 and the vibration component 22 use different magnetic circuits. In this way, the possibility of interaction between the speaker 21 and the vibration component 22 can be reduced, which is conducive to improvement of the reliability of the feedback component.

As shown in FIGS. 14 and 15, in some embodiments, the vibration component 22 further includes a connecting part 227. One end of the connecting part 227 is connected to the moveable part 3, and an other end of the connecting part is connected to the mass block 224, to enable the mass block 224 to drive the moveable part 3 to move.

As shown in FIGS. 14 and 15, in some embodiments, the vibration component 22 further includes a second elastic member 228 which may be also a spring plate. An inner end of the second elastic member 228 is connected to the mass block 224, and an outer end of the second elastic member is connected to the magnetic part 226. The second elastic member 228 can deform in response to movement of the mass block 224.

The second elastic member 228 may be connected to the magnetic part 226 by a spacer block 229, to provide a space for arranging the mass block 224 between the second elastic member 228 and the magnetic part 226. When no current is applied in the drive coil 225, the second elastic member 228 can limit the position of the mass block 224, so that the mass block 224 and the drive coil 225 align with the magnetic part 226. When current is applied in the drive coil 225, the second elastic member 228 can limit the moving direction of the mass block 224, thereby improving the stability of the mass block 224 during movement.

The above mentioned are only the embodiments of the present disclosure. It should be pointed out that for those skilled in the art, improvements can be made without departing from the inventive concept of the present disclosure, but these improvements are all within the scope of protection of the present disclosure.

What is claimed is:

1. A wearable device, comprising:

a casing having an accommodating cavity;

a feedback module arranged in the accommodating cavity; and a moveable part, wherein one end of the moveable part is connected to the feedback module, and an other end of the moveable part contacts with a wearer; and wherein the feedback module includes a speaker and a vibration component, the casing includes an opening, the moveable part is connected to the vibration component through the opening, and the vibration component is able to vibrate along a height direction of the feedback module; the casing includes at least one guide groove, and the at least one guide groove and the opening are defined on a same side of the casing; and wherein the moveable part includes at least one protrusion, and each protrusion of the at least one protrusion is able to move into and move along a respective guide groove of the at least one guide groove.

2. The wearable device according to claim 1, wherein the casing includes at least two guide grooves defined at intervals and surrounding the opening; and wherein the moveable part includes at least two protrusions, and each protrusion of the at least two protrusions is arranged to correspond to a respective guide groove of the at least two guide grooves.

3. The wearable device according to claim 2, wherein a contact part configured to contact with the wearer is arranged on an end of the moveable part away from the vibration component, and the contact part is of a skin friendly material.

4. The wearable device according to claim 1, wherein the feedback module includes a mounting bracket connected to the casing and a magnetic circuit system arranged in the mounting bracket; and wherein the vibration component includes a vibration coil, the speaker includes a voice coil, and the vibration coil and the voice coil extend, along the height direction of the feedback module, into the magnetic circuit system from either sides of the magnetic circuit system.

5. The wearable device according to claim 4, wherein the vibration component includes a first elastic member, one end of the first elastic member is connected to the mounting bracket, and an other end of the first elastic member is connected to the vibration coil; and wherein the first elastic member deforms in response to movement of the vibration coil.

6. The wearable device according to claim 4, wherein the vibration component includes a support member having a main body and fixing parts;

wherein the main body is configured as an annulus, one respective fixing part of the fixing parts arranged on an inner side of the main body is connected to the magnetic circuit system, and one respective fixing part of the fixing parts arranged on an outer side of the main body is connected to the mounting bracket; and wherein in the height direction of the feedback module, the main body is arranged between the moveable part and the vibration coil.

7. The wearable device according to claim 1, wherein in a length direction of the feedback module, the vibration component is arranged on a side of the speaker;

wherein the vibration component includes a mass block, a drive coil, and a magnetic part, the drive coil is sleeved on the mass block, the magnetic part is sleeved on the drive coil, and there is a gap between the magnetic part and the drive coil; and wherein the mass block and the drive coil are moveable along the height direction of the feedback module.

8. The wearable device according to claim 7, wherein the vibration component further includes a connecting part, one end of the connecting part is connected to the moveable part, and an other end of the connecting part is connected to the vibration component.

9. The wearable device according to claim 7, wherein the vibration component further includes a second elastic member, one end of the second elastic member is connected to the mass block, and an other end of the second elastic member is connected to the magnetic part; and wherein the second elastic member deforms in response to movement of the mass block.

* * * * *